Patented Nov. 10, 1925.

1,561,164

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

METHOD OF PRESERVING WOOD.

No Drawing. Application filed December 19, 1921. Serial No. 523,600.

*To all whom it may concern:*

Be it known that I, JOSEPH HIDY JAMES, residing at Pittsburgh, Allegheny County, Pennsylvania, have invented a new and useful Improvement in Methods of Preserving Wood, of which the following is a full, clear, and exact description.

In the preservation of wood, for example, wooden railroad ties, there are a number of requirements. The preservative liquid should be thin enough to penetrate the wood rapidly during impregnation; the liquid should be sufficiently toxic to prevent growth of the organisms which cause decay; it should be sufficiently non-volatile to remain in the wood under weathering conditions; and the liquid should be sufficiently insoluble to avoid being leached out by the water from rains or melting snow or ice.

In a number of copending applications, including my applications, Serial Nos. 272,567; 281,124; 335,940 and 435,355, I have described a method for the catalytic partial oxidation or partial combustion of aliphatic hydrocarbons which produces a mixture of alcohols, aliphatic aldehydes and aldehyde fatty acids. In carrying out said process, a mixture of mineral oil vapor and air passes in contact with a catalytic material, such as the blue oxides of molybenum, at a temperature of from about 230° C. to about 500° C., steam being used or not, as desired. The temperature will vary with the distillate used and also in accordance with the other factors, such as the air ratio, kind of catalyst used, etc. The partially oxidized product is then condensed to give a liquid containing the above compounds. I have found that this mixture possesses all of the desired qualities for wood preservation, particularly where the partial oxidation or partial combustion method is carried out in such a manner as to produce a high percentage of aldehydes relative to the other ingredients.

The following tests for toxicity, etc., will show the value of this mixture as a wood preservative.

The preservative liquid and the agar bottles are both sterilized, transferred to a culture case where the melted agar was poured into the preservative bottle, thoroughly mixed with a shaker, and then poured into sterile petri dishes 100 mm. in diameter and 10 mm. deep. The dishes were cooled over ice.

The material in each petri dish was then inoculated in the center with a weft of mycelium, approximately 6 mm. square, cut from petri dish cultures of the wood-destroying fungus, Formes Amosus Fr. These cultures were from two to three weeks apart.

The dishes were then placed in an incubator and kept at approximately 25° C. for a period of six weeks, inspection being made each week and a record kept of the rapidity and amplitude of growth.

With a preservative liquid containing alcohols, aldehydes and aldehyde fatty acids made from Pennsylvania gas oil by my partial oxidation process, the following results were obtained:

In seventy tests, all concentrations above 1.5% prevented any growth of the organisms. With a preservative liquid made from the same oxidation process from Pennsylvania kerosene, all the concentrations above 1.3% prevented growth. So far as I have found, the minimum concentration in pounds per cubic foot of these partial oxidation mixtures sufficient to inhibit growth is .936 and .749, respectively. This compares favorably in cost and applicability with other commercial preservatives now in use.

In using the product, I preferably extract the air and remaining sap from the wood in suitable containers and then force the hot preservative liquid under pressure into the wood by the general process now well known in connection with other preservative liquids. The details of the process may be varied as desired. If desired, the aldehyde fatty acids may be separated and removed from the liquid mixture by saponification or other desired method.

The process for producing the product may be varied, the percentage of the different ingredients thereof may be varied, and other changes may be made without departing from my invention.

I claim:

1. The process of preserving wood, comprising impregnating the wood with a liquid mixture containing a liquid partial oxidation product derived from a liquid hydrocarbon.

2. The process of preserving wood, comprising impregnating the wood with a liquid mixture containing partially oxidized petroleum hydrocarbon derivatives.

3. The process of preserving wood, comprising impregnating the wood with a liquid mixture containing normally liquid aliphatic aldehydes.

4. The process of preserving wood, comprising impregnating the wood with a liquid mixture containing aliphatic aldehydes of molecular weight higher than formaldehyde.

5. The process of preserving wood, comprising impregnating the wood with a liquid mixture containing alcohols, aldehydes and aldehyde fatty acids, derived by the partial oxidation of petroleum hydrocarbons.

6. As a new article of manufacture, a wood preservative containing partially oxidized petroleum hydrocarbon derivatives.

7. As a new article of manufacture, a wood preservative containing normally liquid aliphatic aldehydes.

8. As a new article of manufacture, a wood preservative containing aliphatic aldehydes of molecular weight higher than formaldehyde.

9. As a new article of manufacture, a wood preservative containing alcohols, aldehydes and aldehyde fatty acids derived by the partial oxidation of petroleum hydrocarbons.

10. As a new article of manufacture, a wood preservative containing a normally liquid partial oxidation product derived from a bituminous hydrocarbon.

In testimony whereof I have hereunto set my hand.

JOSEPH HIDY JAMES.